(12) United States Patent  
Schlechtriemen et al.

(10) Patent No.: US 12,296,515 B2
(45) Date of Patent: *May 13, 2025

(54) METHOD FOR PRODUCING AN INJECTION MOLDED PART, INJECTION MOLD AND FAN IMPELLER

(71) Applicant: Brose Fahrzeugteile SE & Co. Kommanditgesellschaft, Würzburg (DE)

(72) Inventors: Martin Schlechtriemen, Münchberg (DE); Stefan Niedrig, Görlitz (DE); Antje Bussmann, Hude (DE); Michael Albrecht, Dittenheim (DE)

(73) Assignee: Brose Fahrzeugteile SE & Co. Kommanditgesellschaft, Würzburg, Würzburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/767,355

(22) Filed: Jul. 9, 2024

(65) Prior Publication Data

US 2024/0359373 A1 Oct. 31, 2024

Related U.S. Application Data

(63) Continuation of application No. 18/170,756, filed on Feb. 17, 2023, now Pat. No. 12,076,893, which is a (Continued)

(30) Foreign Application Priority Data

Aug. 21, 2020 (DE) .................. 10 2020 210 648.7

(51) Int. Cl.
*B29C 45/00* (2006.01)
*B29C 45/17* (2006.01)
(Continued)

(52) U.S. Cl.
CPC ...... *B29C 45/0046* (2013.01); *B29C 45/0005* (2013.01); *B29C 45/0025* (2013.01);
(Continued)

(58) Field of Classification Search
CPC ............ B29C 45/0046; B29C 45/0005; B29C 45/0025; B29C 45/1711; B29C 45/2669;
(Continued)

(56) References Cited

U.S. PATENT DOCUMENTS 4,880,587 A * 11/1989 Fichlseder .......... B29C 45/2701
264/161
5,225,136 A * 7/1993 Furugohri ........... B29C 45/0025
264/328.8
(Continued)

FOREIGN PATENT DOCUMENTS

CA 2460729 C 1/2007
DE 69205872 T2 4/1996
(Continued)

*Primary Examiner* — Brian Christopher Delrue
(74) *Attorney, Agent, or Firm* — Laurence A. Greenberg; Werner H. Stemer; Ralph E. Locher

(57) ABSTRACT

A method produces an injection molded part. A plastic material is injected into a cavity for forming the injection molded part. The plastic material in a flow line region of the cavity, where the plastic material from two directions coincides during an injection molding process, is at least partially removed from the cavity via at least two overflow points and, in so doing, is locally swirled or mixed between the overflow points.

8 Claims, 3 Drawing Sheets

Related U.S. Application Data continuation of application No. PCT/EP2021/072768, filed on Aug. 17, 2021.

(51) Int. Cl.
  *B29C 45/26* (2006.01)
  *B29L 31/08* (2006.01)
  *F04D 19/00* (2006.01)
  *F04D 29/32* (2006.01)

(52) U.S. Cl.
  CPC ...... *B29C 45/1711* (2013.01); *B29C 45/2669* (2013.01); *F04D 19/002* (2013.01); *F04D 29/325* (2013.01); *F04D 29/326* (2013.01); *B29C 2045/0039* (2013.01); *B29C 2045/0044* (2013.01); *B29C 2045/1713* (2013.01); *B29L 2031/08* (2013.01); *B29L 2031/082* (2013.01)

(58) Field of Classification Search
  CPC .... B29C 2045/0039; B29C 2045/0044; B29C 2045/1713; F04D 19/002; F04D 29/325; F04D 29/326; B29L 2031/08; B29L 2031/082
  See application file for complete search history.

(56) References Cited

U.S. PATENT DOCUMENTS

| | | | |
|---|---|---|---|
| 5,314,326 A | 5/1994 | Furugohri et al. | |
| 5,948,340 A | 9/1999 | Terada et al. | |
| 2002/0106473 A1* | 8/2002 | Hyuga | B29C 45/0046 428/64.1 |
| 2005/0123712 A1* | 6/2005 | Kammler | F04D 29/326 428/66.1 |
| 2005/0238486 A1* | 10/2005 | Stagg | F04D 29/326 415/179 |
| 2007/0104581 A1* | 5/2007 | Stagg | F04D 29/326 416/189 |
| 2008/0176048 A1* | 7/2008 | Onizawa | B29C 45/0001 524/451 |
| 2010/0225020 A1* | 9/2010 | Tracy | B29C 45/0025 264/161 |
| 2012/0269916 A1 | 10/2012 | Kikuchi | |
| 2019/0054673 A1* | 2/2019 | Kuramoto | B29C 45/2669 |
| 2020/0307029 A1* | 10/2020 | Kajiyama | B29C 45/585 |

FOREIGN PATENT DOCUMENTS

| | | |
|---|---|---|
| DE | 102017215570 A1 | 3/2019 |
| DE | 102018101828 A1 | 8/2019 |
| EP | 2127848 A1 | 12/2009 |

\* cited by examiner

METHOD FOR PRODUCING AN INJECTION MOLDED PART, INJECTION MOLD AND FAN IMPELLER

CROSS-REFERENCE TO RELATED APPLICATION

This application is a continuation of U.S. patent application Ser. No. 18/170,756, filed Feb. 17, 2023, which was a continuation, under 35 U.S.C. § 120 of copending International Patent Application PCT/EP2021/072768, filed Aug. 17, 2021, which designated the United States; this application also claims the priority, under 35 U.S.C. § 119, of German Patent Application DE 10 2020 210 648.7, filed Aug. 21, 2020; the prior applications are herewith incorporated by reference in their entireties.

FIELD AND BACKGROUND OF THE INVENTION

The invention relates to a method for producing an injection molded part. The invention furthermore relates to an injection mold for carrying out the method and to a radiator fan impeller produced according to the method.

For active cooling of internal combustion engines, electric motors or vehicle batteries in motor vehicles, radiator fans are provided, for example, delivering an air flow through a vehicle radiator. Such radiator fans often have a fan shroud and a fan impeller, which is arranged rotatably in a fan impeller aperture of the fan shroud. The fan impeller of such a radiator fan generally has a central hub cup with a number of radially oriented blades and an outer ring connecting the blades to one another at the blade tips.

Such fan impellers are generally produced as injection molded parts from a plastic material, in particular a thermoplastic. To improve the mechanical properties, in particular to improve the mechanical strength or stiffness, reinforcing fibers are often added to the plastic material. In other words, a fiber-reinforced, thermoplastic material is preferably used in the production of the fan impeller.

In the course of the injection molding process, the plastic material is injected by means of nozzles into a cavity as a (negative) mold for the fan impeller. The injection or gating point of the injection mold or of the negative mold is arranged in the middle or centrally in the region of the hub cup, for example, from where the pressurized plastic material or plastic melt is distributed in the cavity. The result is that, in the region of the outer ring, melt flows converge from two directions between two blades.

During this process, the (reinforcing) fibers of the plastic material generally align themselves in the direction of flow of the plastic melt. The converging flow fronts of the melt flows come to a standstill, as a result of which unfavorable (diffuse) orientations of the fibers transversely to the flow direction occur, forming what is referred to as a flow line as a boundary layer in the cooled state. In the region of the flow line, the reinforcing fibers are oriented parallel to the flow line, as a result of which a local drop in the strength characteristic of the fan impeller, that is to say a mechanical weak point, occurs. Disadvantageously, such flow lines usually run axially in straight lines and radially from the inside to the outside through the outer ring, thereby forming a potential weak point.

Published, non-prosecuted German patent application DE 10 2017 215 570 A1 discloses an injection molding method for producing a fan impeller in which an overflow cavity, on the one hand, and an insert element, on the other hand, are provided eccentrically with respect to the flow line. The insert element acts on one side of the flow line as a displacement volume, giving rise to a region free of plastic material. On the other side of the flow line, at least some of the melt flow can flow into the overflow cavity as a receiving volume. After the cavity has been filled, the insert element is removed and the plastic material is forced back out of the overflow cavity into the cavity of the injection mold. This results in a material flow from the overflow cavity via the flow line into the freed volume of the removed insert element. As a result, the flow line is subsequently mixed or flowed over, whereby fiber distributions orthogonally to the course of the flow line are in part achieved.

U.S. patent publication No. 2005/0238486 A1 discloses an injection molding method for producing a fan impeller in which an overflow cavity is preferably provided in the region of the flow line in order to influence the fiber orientation.

SUMMARY OF THE INVENTION

The underlying object of the invention is to specify a particularly suitable method for producing an injection molded part. In particular, the intention is to improve the mechanical properties in the region of a flow line. The underlying object of the invention is furthermore to specify a particularly suitable injection mold and a particularly suitable fan impeller.

According to the invention, the object is achieved with regard to the method by means of the features of the independent method claim, with regard to the injection mold by means of the features of the independent injection mold claim, and with regard to the fan impeller by means of the features of the independent fan impeller claim. Advantageous embodiments and developments form the subject matter of the dependent claims.

Where method steps are described below, advantageous embodiments for the injection mold are obtained, in particular, from its being designed to carry out one or more of these method steps.

The method according to the invention is provided for producing an injection molded part and is suitable and configured for this purpose. In other words, the method is an injection molding method. According to the method, a plastic material or a plastic melt is injected into a cavity forming the injection molded part. The (component) cavity is thus embodied as a negative mold for the injection molded part. Here, a cavity is to be understood, in particular, as a volume or a space for receiving a liquefied or melted plastic material. In this context, the plastic material is embodied as a thermoplastic material, in particular a fiber-reinforced thermoplastic material.

In this case, the cavity is shaped in such a way that, in the course of the injection molding process, at least one flow line region is formed, in which the plastic material converges from two directions. In other words, two or more melt flows of the plastic melt converge in a flow line region. The flow line region thus denotes a region of the cavity at which a flow line of the injection molded part is formed on account of the injection molding process. This means that the flow line region is a region or section of the cavity at which at least two flow fronts of the plastic melt converge and come to a standstill.

According to the invention, at least two overflow points are provided in the region of the flow line, at which points the plastic material is partially removed from the cavity. The cavity is thus preferably not filled at the overflow points;

instead, the cavity is vented by means of the overflow points. This means that the overflow points allow the plastic material or the plastic melt to flow out of the component cavity. In other words, the melt flows flow out of the cavity at least in part via the overflow points.

As a result of the overflow points, branching or diversion of the melt flows is thus achieved, resulting in local swirling and mixing of the melt flows in the region of the flow line between the overflow points. In other words, the material flows are mixed in the flow line region, as a result of which a material flow at least partially transversely to the flow line is formed. As a result, it is not possible for a rectilinear flow line of the injection molded part to form during solidification of the plastic melt. Thus, the flow line region is reinforced or mechanically stabilized, thereby ensuring that a particularly stable injection molded part is obtained. A particularly suitable production method for an injection molded part is thereby achieved.

In the region of an overflow point, there is a high fiber orientation, the reinforcing fibers being oriented approximately in a V-shape, as a result of which a fiber orientation referred to below as a notch is formed in the direction of the overflow point. In this case, the overflow points are suitably not arranged at a component edge or a parting plane of the injection molded part but at a component surface of the injection molded part. By relocating the overflow points from an edge or a parting plane of the injection molded part to a component surface, that is to say toward an inner region of the injection molded part, the notch is relocated into the component surface. As a result, the notches are arranged at a distance from the mechanically more sensitive edges or parting planes of the injection molded part.

In contrast to the prior art, the plastic material is not returned into the cavity after it has been discharged or has flowed out from the latter. Thus, there is no flow over the flow line region. According to the invention, the intermixing or swirling of the melt flows or reinforcing fibers transversely to the flow line is achieved by two spaced overflow points, which are arranged eccentrically with respect to the flow line region, for example. A simplified method for stabilizing and strengthening the flow line is thereby obtained.

The advantages and configurations cited with respect to the method can also be transferred mutatis mutandis to the injection mold described below and vice versa. In this case, the injection mold according to the invention is provided for carrying out the method described above and is suitable and set up for this purpose.

The injection mold has a cavity forming the injection molded part, wherein at least two (sprue) tunnels are provided as overflow points, which preferably couple the cavity to at least one overflow cavity. For example, two overflow cavities are provided which are each connected to the cavity by means of a tunnel. It is likewise conceivable that both tunnels are routed to a common overflow cavity.

The tunnels are arranged as overflow points at a flow line region of the cavity in such a way that when the plastic material converges from two (flow) directions in the flow line region during an injection molding process, the plastic material is at least partially guided into the at least one overflow cavity via the tunnels, as a result of which the plastic material or melt flows is/are locally swirled or mixed in the flow line region. This results in improved mixing of the melt flows and thus of the reinforcing fibers in the flow line region, thereby mechanically stabilizing the flow lines formed in the injection molded part. Thus, a particularly suitable injection mold is obtained.

If the injection mold has a plurality of flow line regions, two tunnels are preferably provided for each flow line region, which tunnels are connected to at least one overflow cavity.

In an advantageous embodiment, the tunnels are arranged offset from the flow line region along one of the directions. In other words, the tunnels are arranged on a common side of the flow line region, that is to say on one side with respect to the flow line region.

In an alternative embodiment, the tunnels are arranged offset from the flow line region along the directions, with the result that the plastic material is locally swirled or mixed between the tunnels. In other words, the overflow points or tunnels are arranged eccentrically with respect to the flow line region, that is to say the region of the flow line is arranged between the connection points of the tunnels. The tunnels are thus arranged on both sides or on two sides with respect to the flow line region. This means that the tunnels are arranged offset from the flow line region along the flow directions of the melt flows. This ensures reliable swirling or mixing of the melt flows transversely to the flow line region.

In a preferred embodiment, the at least two tunnels are arranged tangentially and axially offset from one another. This means that a connecting line between the tunnel entrances is arranged obliquely or diagonally to the flow line region. As a result of this offset arrangement, at least one of the flow fronts of the melt flows is distorted or deformed, with the result that the melt flows are displaced relative to one another axially and tangentially, at least in some section or sections, transversely to the flow line region. Consequently, the reinforcing fibers are also arranged in the tangential and axial directions in the flow line region, thereby improving the mechanical load-bearing capacity of the injection molded part at this point; as a result, the reinforcing fibers are reoriented in the flow line region without producing a notch.

In a suitable development, the tunnels open perpendicularly into the cavity. This means that the tunnels or overflow cavity (cavities) are arranged perpendicularly to the component surface of the injection molded part. This ensures a particularly expedient alignment of the reinforcing fibers, as a result of which a particularly stable flow line of the injection molded part is achieved.

In a preferred application, the injection molded part is designed as a fan shroud or a fan impeller of a radiator fan of a motor vehicle. In this case, the fan impeller has a central hub cup (hub body), on which radially outwardly oriented blades (fan blades) extend. An outer ring connecting the tips is arranged at the blade tips, i.e. on the blade tip side or on the radially outer region. The outer ring improves the aerodynamic behavior of the fan impeller during operation and, in particular, has an L-shaped cross section.

A "fan impeller" for purposes of the present invention is, in particular, a rotationally symmetrical component which has a hub, in particular in the form of a hub cup, and a number of blades attached thereto. In the case of a fan impeller driven by an electric motor, the hub represents the connection to the electric motor, in particular via a shaft projecting therefrom, ensuring that a torque generated by the motor is transmitted to the fan impeller. The blades are provided and/or configured to generate an air volume flow as soon as a rotary motion is imparted to the fan impeller.

A "hub cup" for purposes of the present invention is, in particular, a central part of the fan impeller which is made up of a base surface and an adjoining cylindrical surface in the manner of a classic cup. In particular, the blades are arranged, in particular integrally formed, on this cylindrical outer wall. The hub cup is arranged in the center of the fan impeller and provides a connection to a drive, in particular to an electric motor, if it is a fan impeller driven by an electric motor.

A "blade" for purposes of the present invention is a flat body that is oriented in the radial direction in a plane to which the axis of rotation is perpendicular and that is curved in the shape of a crescent in this plane and/or is inclined with respect to this plane. For purposes of the present invention, a blade is also understood to mean a vane (fan vane) or a rotor blade. The blade is arranged on the hub cup and is provided, in particular configured, to generate an air volume flow as soon as a rotary motion is imparted to the fan impeller.

Here and in the following, "axial" or an "axial direction" is understood to mean, in particular, a direction parallel (coaxial) to the axis of rotation of the fan impeller, that is to say perpendicular to the end faces of the hub cup. In corresponding fashion, here and in the following, "radial" or a "radial direction" is understood to mean, in particular, a direction oriented perpendicularly (transversely) to the axis of rotation of the fan impeller along a radius of the fan impeller. Here and in the following, "tangential" or a "tangential direction" is understood to mean, in particular, a direction along the circumference of the fan impeller or of the outer ring (circumferential direction, azimuthal direction), i.e. a direction perpendicular to the axial direction and to the radial direction.

In an expedient embodiment, the flow line region is arranged on the outer ring, in particular between two adjacent blades. In this case, the tunnels are not connected laterally to the parting planes of the two L-leg ends of the outer ring but along the vertical L-leg on the circumferential surface of the outer ring. As a result, a fiber orientation transverse to the circumferential direction, and thus transverse to the loading direction, is achieved.

In one conceivable embodiment, the tunnels are positioned radially on the inside, i.e. on the inside, facing the hub cup, of the outer ring. Alternatively, the tunnels are arranged radially on the outside, or in each case one tunnel is arranged radially on the inside and one tunnel is arranged radially on the outside.

The fan impeller according to the invention is provided for a radiator fan of a motor vehicle and is suitable and configured for this purpose. The single-part, that is to say one-piece or monolithic, fan impeller is embodied as an injection molded part made of fiber-reinforced thermoplastic material and has a central hub cup with a number of radially oriented blades and an outer ring connecting the blades to one another at the blade tips. A fan impeller with a particularly high flow line strength is thereby achieved, as a result of which the operational reliability and service life of the fan impeller and thus of the radiator fan is improved.

In this context, the statements made in connection with the method and/or the injection mold also apply mutatis mutandis to the fan impeller and vice versa.

Here and in the following, the conjunction "and/or" is to be understood in such a way that the features linked by means of this conjunction can be formed both jointly and as alternatives to one another.

Other features which are considered as characteristic for the invention are set forth in the appended claims.

Although the invention is illustrated and described herein as embodied in a method for producing an injection molded part, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In all the figures, mutually corresponding parts and dimensions are always provided with the same reference signs.

Figure 1:
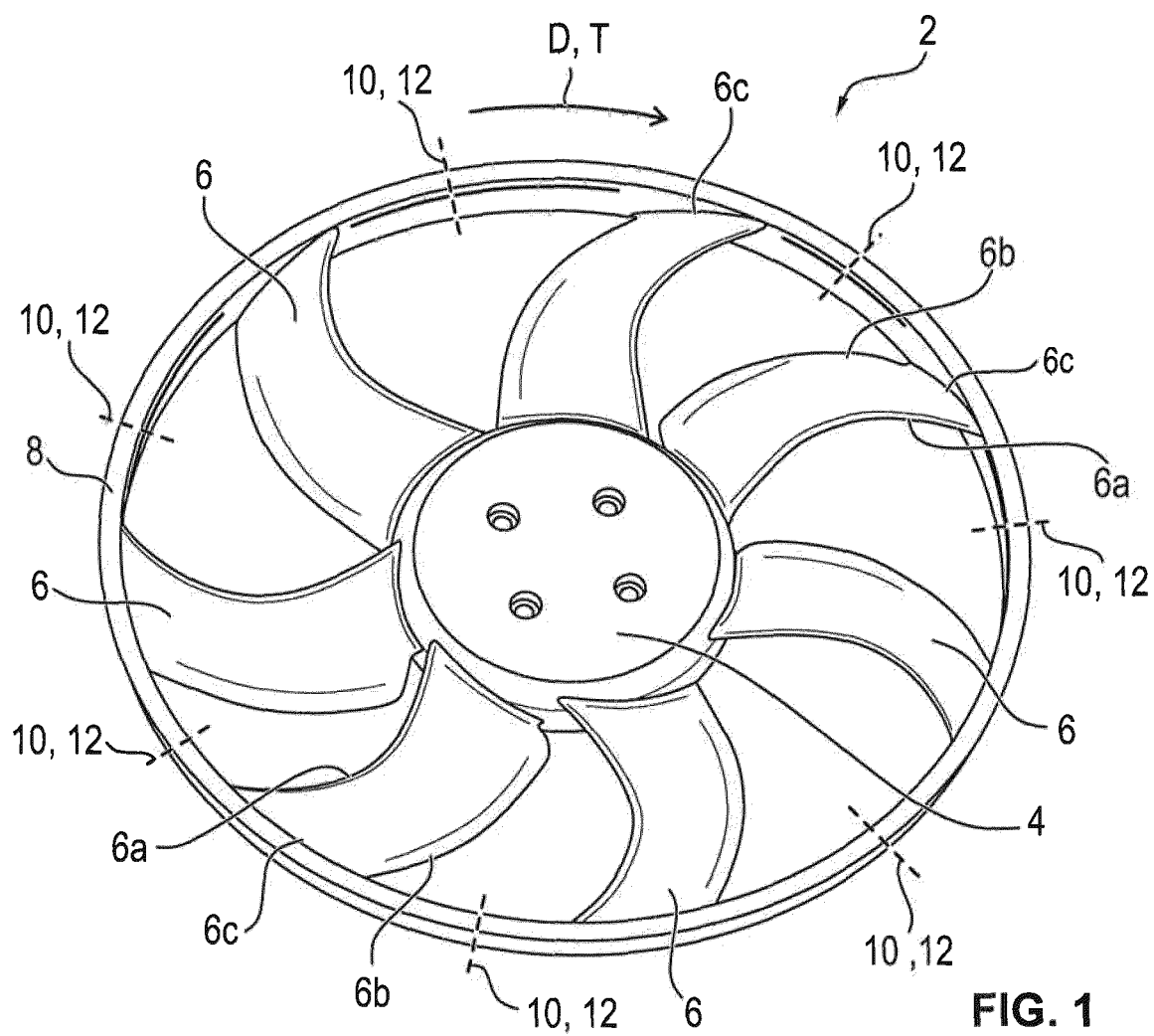
FIG. 1 is a diagrammatic, perspective view of a fan impeller according to the invention.

Referring now to the figures of the drawings in detail and first, particularly to FIG. 1 thereof, there is shown a fan impeller 2 of a radiator fan (not illustrated specifically) or radiator fan module of a motor vehicle in perspective.

The fan impeller 2 has a central hub cup 4, on an outside of which a number of fan blades (fan vanes) 6, which are oriented in a radial direction R, are integrally formed. In this exemplary embodiment, the fan impeller 2 has seven blades 6. In FIG. 1, purely by way of example, the blades 6 are provided with reference signs.

Here and in the following, "axial" or an axial direction A is understood to mean, in particular, a direction parallel (coaxial) to the axis of rotation of the fan impeller 2, that is to say perpendicular to the end faces of the hub cup 4. In corresponding fashion, here and in the following, "radial" or a radial direction R is understood to mean, in particular, a direction oriented perpendicularly (transversely) to the axis of rotation of the fan impeller 2 along a radius of the fan impeller 2. Here and in the following, "tangential" or a tangential direction T is understood to mean, in particular, a direction along the circumference of the fan impeller 2 (circumferential direction, azimuthal direction), i.e. a direction perpendicular to the axial direction A and to the radial direction R.

During operation of the radiator fan module, the fan impeller 2 is driven in rotation, by an electric motor coupled in terms of drive to the hub cup 4, in the direction of rotation symbolized by the arrow D in FIG. 1. Here, the direction of rotation D is parallel to the tangential or circumferential direction T of the fan impeller 2. In this direction of rotation D or in the tangential direction T, the blades 6 are configured so as to be concave at their leading edges 6a and substantially convex and preferably wavy at their trailing edges 6b.

The blades 6 are connected to one another or mechanically coupled to one another at their blade tips 6c by means of a circumferential outer ring 8. The outer ring 8 serves, inter alia, to stabilize the blades 6 during the rotary motion of the fan impeller 2. By means of the outer ring 8, the air flow is also guided, and the aerodynamic properties of the fan impeller 2 are improved.

The outer ring 8 has a tangentially extending outer band 8a and a radial lip 8b projecting radially around the outer band 8a. As can be seen, in particular, in FIGS. 3 and 4, the outer ring 8 thus has an approximately L-shaped cross-sectional shape in the section planes shown, wherein the outer band 8a extends as a vertical L-leg and the radial lip 8b extends as a horizontal L-leg in the radial direction over the outer circumference of the outer ring 8 or outer band 8a.

The fan impeller 2 is embodied as a single-part, i.e. one-piece or monolithic, injection molded part. In this case, the fan impeller 2 is produced from a thermoplastic and fiber-reinforced plastic material, which is injected by means of nozzles into a cavity 13 (FIG. 4) of an injection mold (not shown specifically) in the course of the injection molding process.

The injection or gating point of the injection mold or of the cavity 13 is arranged in the middle or centrally in the region of the hub cup 4, for example, from where the pressurized plastic material or plastic melt is distributed in the cavity. The result is that, in the region of the outer ring, in each case two melt flows converge from two directions between two blades. In the cooled or cured state of the plastic material, the converging melt flows form a flow line 10, wherein the region in which the flow line 10 occurs is referred to below as a flow line region 12. As can be seen in FIG. 1, the fan impeller 2 has seven such flow lines 10 or flow line regions 12.

Figure 4:
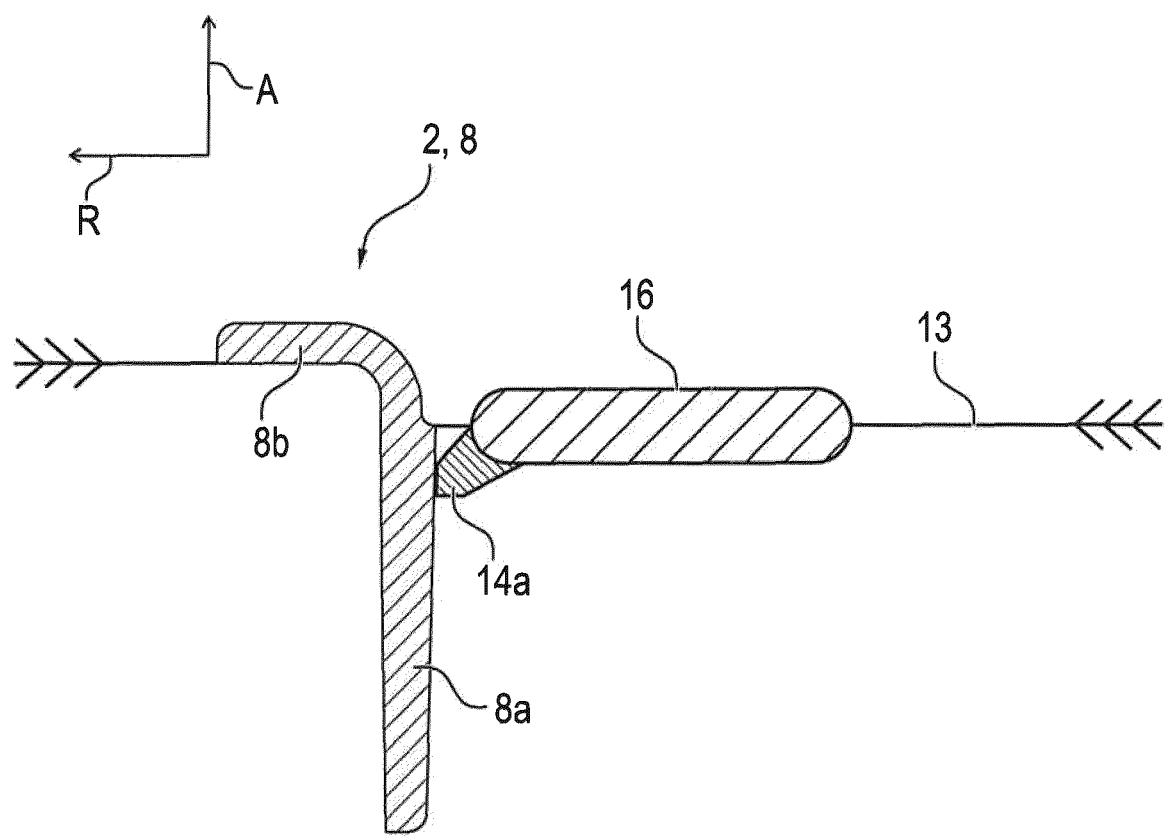
FIG. 4 is a sectional view of the outer ring and an overflow cavity of the injection mold.

In order to mechanically stabilize and improve the flow line strength, at least two overflow points 14a, 14b are provided for each flow line region 12 of the cavity, at which overflow points the plastic material is partially removed from the cavity 13. The overflow points 14a, 14b are, in particular, embodied as (sprue) tunnels, which open into one or more overflow cavities 16 (FIG. 4).

The overflow points 14a, 14b, which are also referred to below as tunnels, are arranged off-center and offset relative to one another in the flow line region 12, with the result that when the plastic material converges from two (flow) directions S1, S2 in the flow line region 12 during an injection molding process, the plastic material is at least partially guided into the overflow cavity (cavities) 16 via the tunnels 14a, 14b and, as a result, the plastic material or melt flows is/are locally swirled or mixed in the flow line region 12.

Figure 2:
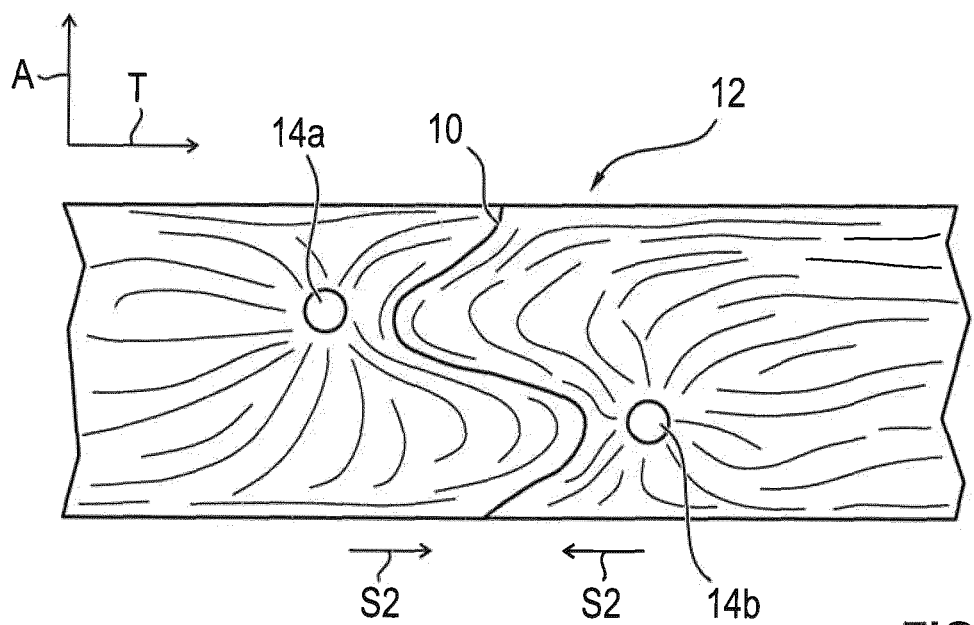
FIG. 2 is a sectional view of a flow line region of the fan impeller with two overflow points of an injection mold.
Figure 3:
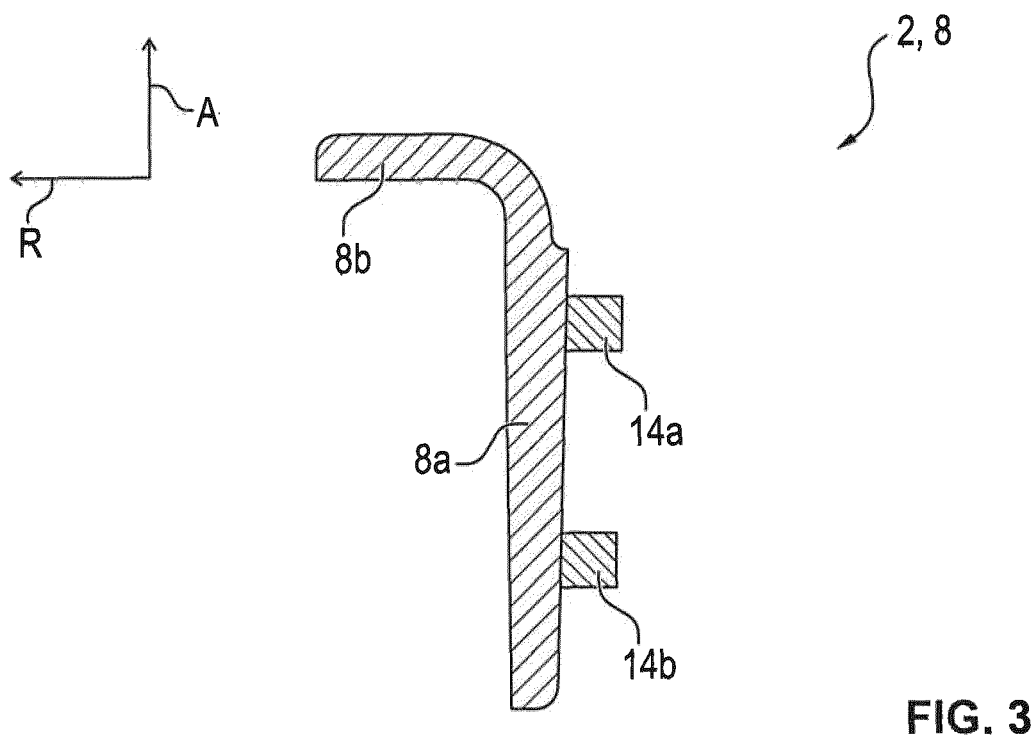
FIG. 3 is a sectional view of an outer ring of the fan impeller with two tunnels as overflow points.

As can be seen comparatively clearly in FIGS. 2 and 3, the two tunnels 14a, 14b are arranged tangentially and axially offset relative to one another, with the result that the flow line 10 is positioned between the tunnels 14a, 14b in the tangential direction. The tunnels 14a, 14b open out substantially perpendicularly onto the component surface of the outer ring 8b, as is shown particularly in FIG. 4 for tunnel 14a. The tunnels 14a, 14b are thus spaced apart from an edge or a parting plane of the fan impeller 2 or outer ring 8. In this case, the tunnels 14a, 14b are arranged radially on the inside of the outer band 8b.

As can be seen, in particular, in the illustration of FIG. 2, a flow line 10 is formed in the outer ring 8 in the flow line region 12 owing to the offset arrangement of the tunnels 14a, 14b on the sheet-like inner circumference of the outer band 8b. As a result, a high orientation of the reinforcing fibers of the plastic material, which are illustrated as lines in FIG. 2, is achieved, thereby increasing the strength of the flow line 10 or in the flow line region 12.

Figure 5:
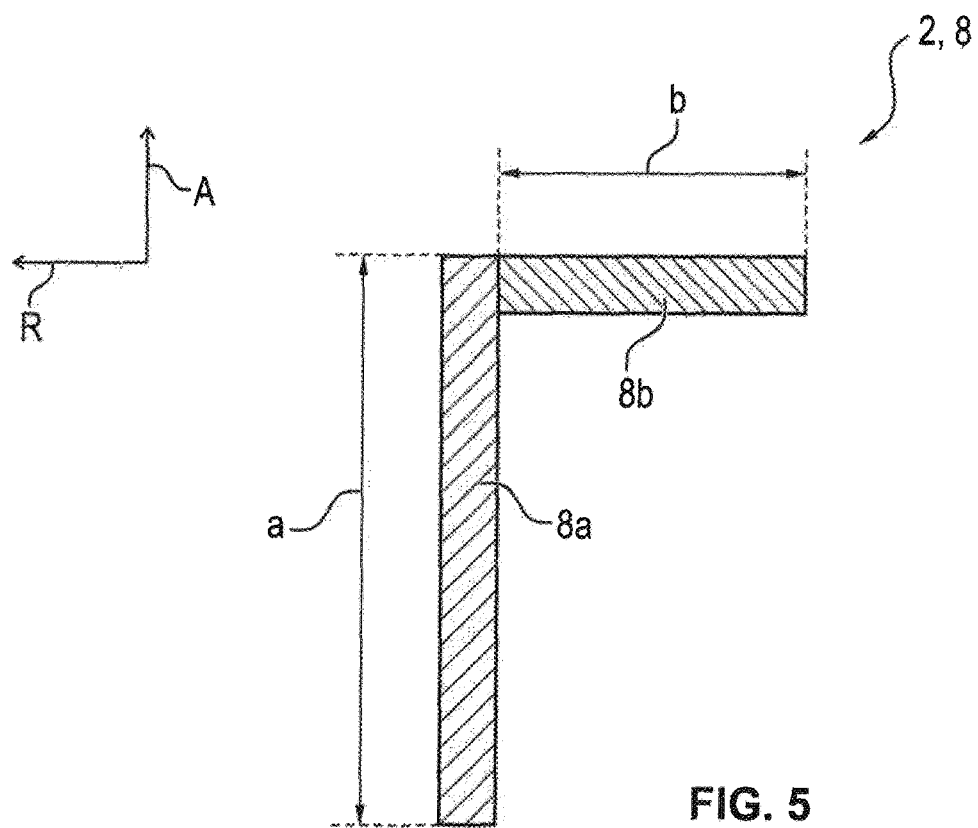
FIG. 5 is a schematic side view of the outer ring of the fan impeller.
Figure 6:
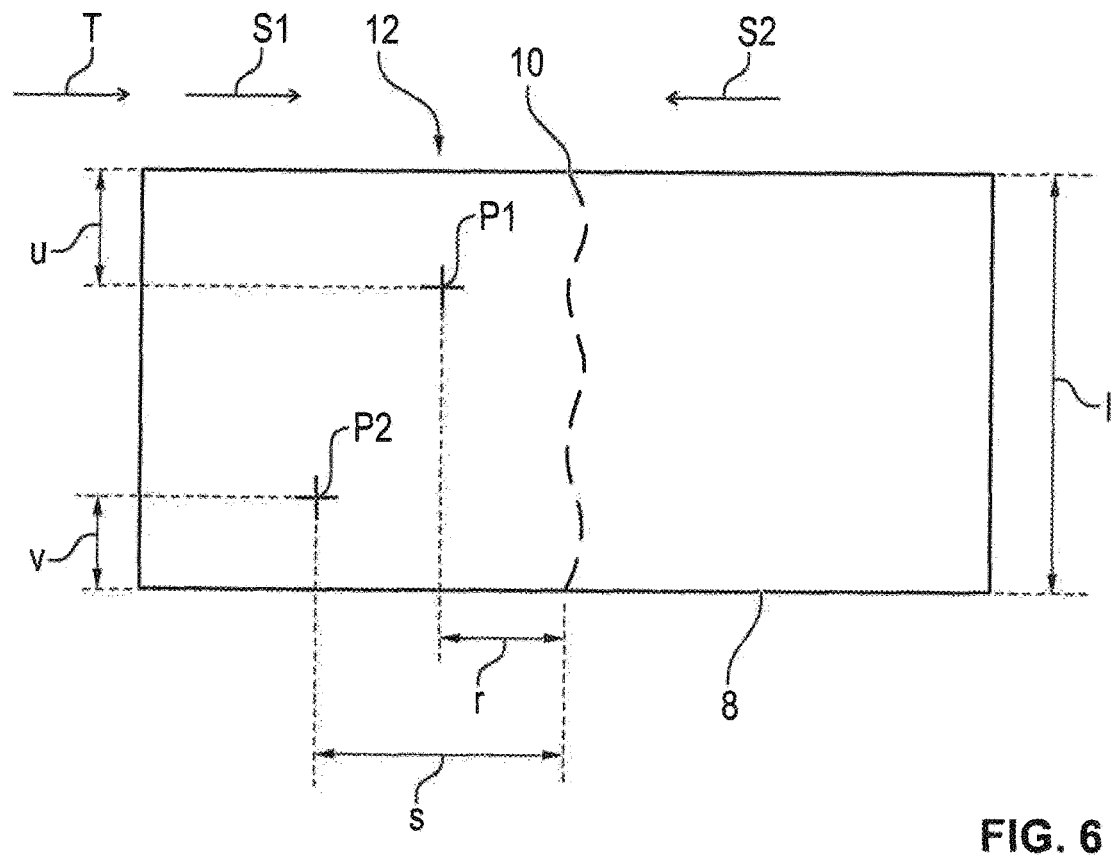
FIG. 6 is a sectional plan view of the outer ring.

A second exemplary embodiment of the invention is shown in FIGS. 5 and 6. In this embodiment, the tunnels 14a, 14b are arranged on a common side of the flow line 10, that is to say offset with respect to the flow line region 12 along one of the directions S1, S2. The relative positioning of the tunnels 14a, 14b with respect to the flow line 10 is explained in greater detail below.

Hereinafter, the axial height of the outer band 8a is denoted by a and the radial width of the radial lip 8b is denoted by b, wherein the height a is preferably longer than the width b. The sum of the height a and the width b is referred to below as length l (l=a+b).

FIG. 6 shows a projected illustration of the outer ring 8. Tunnel 14a is arranged at a position P1 and tunnel 14b is arranged at a position P2, which are arranged offset with respect to the flow direction S1 in the flow line region 12. Position P1 is at a tangential distance r from the flow line 10, while position P2 is at a tangential distance s. Position P1 is at an axial/radial distance u from an (upper) edge of the outer ring 8, while position P2 is at a radial/axial distance v from an opposite (lower) edge of the outer ring.

In a suitable dimensioning, the following relationships apply:

$$10 \text{ mm} \leq r \leq 25 \text{ mm},$$

$$r + 10 \text{ mm} \leq s \leq r + 25 \text{ mm},$$

$$*l \leq u \leq 0.49 * l, \text{ and}$$

$$*l \leq v \leq 0.49 * l.$$

This means that the distance r is preferably between 10 mm (millimeters) and 25 mm, where, depending on the distance r, the distance s is between 10 mm+r and 25 mm+r. The distances u and v are preferably dimensioned to be between 10% and 49% of the length l.

The invention is not restricted to the exemplary embodiment described above. On the contrary, other variants of the invention can also be derived therefrom by a person skilled in the art without departing from the subject matter of the invention. In particular, all the individual features described in connection with the exemplary embodiment can also be combined with one another in some other way without departing from the subject matter of the invention.

The following is a summary list of reference numerals and the corresponding structure used in the above description of the invention.

LIST OF REFERENCE SIGNS 2 fan impeller
4 hub cup
6 blade
6a leading edge
6b trailing edge
6c blade tip
8 outer ring
8a outer band
8b radial lip
10 flow line
12 flow line region
13 cavity
14a, 14b overflow point/tunnel
16 overflow cavity
A axial direction
R radial direction
T tangential direction D direction of rotation
S1, S2 flow direction
a height
b width
l length
P1, P2 position
r, s, u, v distance

The invention claimed is:

1. A method for producing an injection molded part, which comprises the steps of:
   injecting a plastic material into a cavity for forming the injection molded part, wherein the plastic material in a flow line region of the cavity, where the plastic material converges from two directions during an injection molding process, is at least partially removed from the cavity via at least two overflow points that are disposed tangentially and axially offset from one another and, during the injection molding process, is locally swirled or mixed between the at least two overflow points.

2. The method according to claim 1, wherein the at least two overflow points are disposed offset from the flow line region along one of the two directions.

3. The method according to claim 1, wherein the at least two overflow points open perpendicularly into the cavity.

4. The method according to claim 1, wherein the injection molded part is a fan impeller for a radiator fan.

5. The method according to claim 4, wherein the cavity producing the injection molded part as the fan impeller having a central hub cup with a plurality of radially oriented blades and an outer ring connecting the radially oriented blades to one another at blade tips.

6. The method according to claim 5, wherein the flow line region is disposed at the outer ring.

7. The method according to claim 5, wherein the flow line region at the outer ring is disposed between two adjacent ones of the radially oriented blades.

8. The method according to claim 5, wherein the at least two overflow points are positioned radially on an inside of the outer ring.

* * * * *